US006618275B2

(12) United States Patent
Suzuki et al.

(10) Patent No.: US 6,618,275 B2
(45) Date of Patent: Sep. 9, 2003

(54) PORTABLE GENERATOR

(75) Inventors: Kouji Suzuki, Kakuda (JP); Takeshi Shinohara, Kakuda (JP); Jun Takahashi, Kakuda (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 10/166,645

(22) Filed: Jun. 12, 2002

(65) Prior Publication Data

US 2002/0191417 A1 Dec. 19, 2002

Related U.S. Application Data

(63) Continuation of application No. PCT/JP00/08956, filed on Dec. 18, 2000.

(30) Foreign Application Priority Data

Dec. 17, 1999 (JP) .......................................... 11-358239

(51) Int. Cl.⁷ .............................................. H02M 5/45
(52) U.S. Cl. ..................................................... 363/37
(58) Field of Search ............................. 363/34, 35, 36, 363/37, 95, 97

(56) References Cited

U.S. PATENT DOCUMENTS

| 5,400,236 A | | 3/1995 | Shimizu et al. ............... 363/37 |
| 5,483,167 A | * | 1/1996 | Mikami ....................... 324/510 |
| 6,317,339 B1 | * | 11/2001 | Shimazaki et al. ........... 363/37 |
| 6,515,882 B2 | * | 2/2003 | Moriguchi et al. ........... 363/97 |

* cited by examiner

Primary Examiner—Matthew V. Nguyen
(74) Attorney, Agent, or Firm—Finnegan, Henderson, Farabow, Garrett & Dunner, LLP

(57) ABSTRACT

An engine-driven portable generator using an inverter may still generate a voltage at its output terminals even though the engine is stopped. In view of this problem, the invention is to provide a portable generator, which is intended to prevent any residual voltage from generating between the output terminals. That is, a portable generator rectifying once an AC voltage into a DC voltage, converting the DC voltage into a single-phase AC voltage, and outputting the single-phase AC voltage, which has an output-stop-control unit (443) that, when an operating switch (305) is turned off, stops the operation of the inverter circuit at the timing when the voltage between the output terminals drops to 0, is provided.

1 Claim, 11 Drawing Sheets

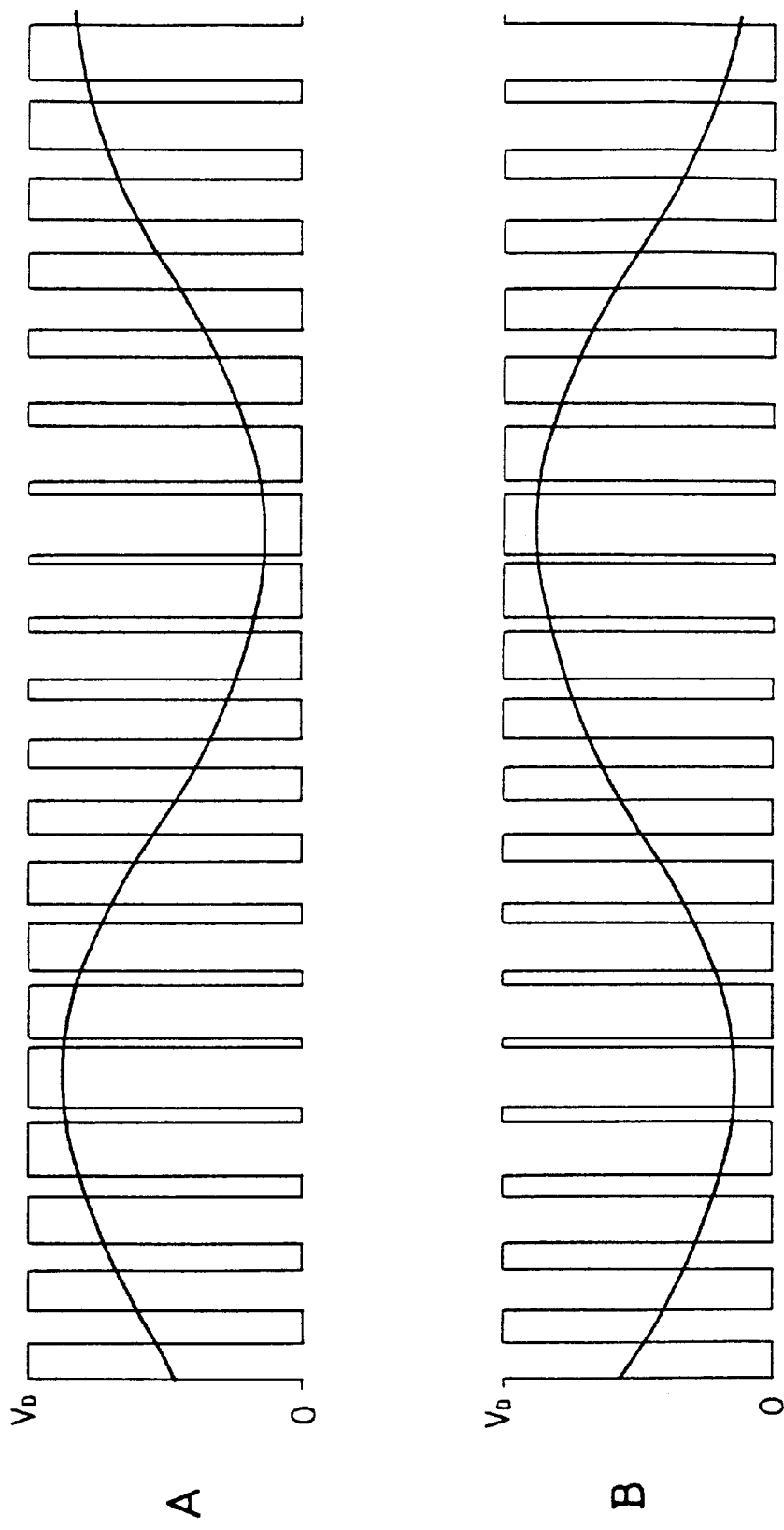

PORTABLE GENERATOR

RELATED CASES

This application is a continuation of and/or claims priority under 35 USC § 119 and/or 120 to the following:

PCT Patent Application No. PCT/JP00/08956, filed Dec. 18, 2000; and

Japanese Patent Application No. 11 358239 filed Dec. 17, 1999.

TECHNICAL FIELD

The present invention relates to a portable generator which generates an AC voltage of 100 V or the like by being turned by an engine.

BACKGROUND ART

Today, small generators driven by a gasoline engine or a diesel engine, permitting conveyance to where they are needed and capable of developing a per-unit output of several kilowatts to ten-odd kW, have come into extensive use.

Such portable generators permitting ready conveyance include generators enabled, by keeping the frequency of engine revolutions constant, to develop a single-phase AC voltage of around 100 V in average output voltage at a frequency of 50 or 60 Hz.

However, more recently, there have been proposed systems whereby the output of an engine-driven AC generator is once rectified into a DC voltage and this DC voltage is further converted with an inverter into an output voltage having a constant frequency of 50 Hz or 60 Hz (e.g. JP 63-114527 A and JP 63-302724 A).

An engine-driven small portable generator capable of developing an output of several kilowatts to ten-odd kW is not only carried to where they are needed and used for power generation always in a movable state but also may be semi-permanently installed in a fixed position where it is required to operate continually for some time.

This inverter-equipped portable generator, as shown in FIG. 10, has an engine-driven AC generator 50, a DC-voltage-generating circuit 110 using rectifier diodes 115 and thyristors 111, a DC-power-source unit 120 using a large-capacitance capacitor 121 consisting of a required number of capacitors connected in parallel, an inverter circuit 130 using a power transistor, and a low pass filter 140 using a coil and a capacitor.

It further has, as control circuits for driving and controlling such power circuits as these DC-voltage-generating circuit 110 and inverter circuit 130, a PWM-signal-generating circuit 250, a voltage-limiting circuit 240, an overload-detecting circuit 260 and an inverter-drive circuit 255. This portable generator 100 also has, as power-supply units for driving these control circuits, a smoothing circuit 210 and a constant-voltage circuit 235.

Many of the AC generator 50 in use whose rotor is turned by such an engine has a three-phase output coil 51 and a single-phase output coil 55. In many cases, the three-phase output coil 51 can develop a maximum output of tens of amperes at hundreds of volts, while the single-phase output coil 55 can develop an output of tens of amperes at tens of volts.

The DC-voltage-generating circuit 110 to which the output terminal of this three-phase output coil 51 is connected is configured of a rectifier bridge circuit using three rectifier diodes 115 and three thyristors 111. The both output terminals of this rectifier bridge circuit is connect to both ends of the main smoothing capacitor 121, which uses the DC-power-source unit 120, to charge the capacitor 121.

Incidentally, the gate terminal of each thyristor 111 in the DC-voltage-generating circuit 110 is connected to the voltage-limiting circuit 240 to control the continuity angle of each thyristor 111, and the voltages at both ends of the main smoothing capacitor 121, which uses the DC-power-source unit 120, are thereby regulated.

The inverter circuit 130 is configured of a bridge circuit using four power transistors. In this inverter circuit 130, a first transistor 131 and a third transistor 133, arranged in series, are connected to the DC-power-source unit 120, and a second transistor 132 and a fourth transistor 134, arranged in series, are connected to the DC-power-source unit 120. The midpoint between the first transistor 131 and the third transistor 133 is connected to a first output terminal 151 via the lowpass filter 140, and the midpoint between the second transistor 132 and the fourth transistor 134 is connected to a second output terminal 152 via the low pass filter 140. Further the base of the first transistor 131 and the base of the fourth transistor 134 are commonly connected to the inverter-drive circuit 255, and the base of the second transistor 132 and the base of the third transistor 133 are commonly connected to an inverter-drive circuit 255.

A first PWM signal supplied from this inverter-drive circuit 255 to the first transistor 131 and the fourth transistor 134 and a second PWM signal supplied from this inverter-drive circuit 255 to the second transistor 132 and the third transistor 133 are high-frequency pulse signals of several kHz or more. The pulse width of each pulse signal is successively varied between 50 Hz and 60 Hz, and the varying quantity of the pulse width is successively increased or decreased in a sine-wave shape.

Further, the first PWM signal and the second PWM signal are reverse in phase to each other. For this reason, continuity is established between the first transistor 131 and the fourth transistor 134 by the first PWM signal, while discontinuity is ensured between the second transistor 132 and the third transistor 133 by the second PWM signal, and when the midpoint between the first transistor 131 and the third transistor 133 has a voltage VD, which is the voltage of the DC-power-source unit 120, the midpoint between the second transistor 132 and the fourth transistor 134 is at 0 V. When continuity is established between the second transistor 132 and the third transistor 133 by the second PWM signal, the first PWM signal ensures discontinuity between the first transistor 131 and the fourth transistor 134, sets the midpoint between the first transistor 131 and the third transistor 133 to 0 V, and the midpoint between the second transistor 132 and the fourth transistor 134 then to the voltage VD of the DC-power-source unit 120.

This midpoint potential between the first transistor 131 and the third transistor 133 changes over at high speed between 0 V and the voltage VD of the DC-power-source unit 120 as shown in FIG. 11A, and the duration of the DC source voltage VD successively varies. Also, the midpoint potential between the second transistor 132 and the fourth transistor 134 also changes over at high speed between 0 V and the voltage VD of the DC-power-source unit 120 as shown in FIG. 11B, and the duration of the DC source voltage VD successively varies.

As a result, a first output voltage and a second output voltage having passed the low pass filter 140 using a coil and a capacitor are cleared of harmonic contents and are turned into sine-wave voltages of 50 Hz or 60 Hz as shown in FIG. 11. Then, the voltage of the first output terminal 151 and the voltage of the second output terminal 152 are generated as AC output voltages of 50 Hz or 60 Hz averaging 100 V, with their peak level and bottom level staggered by a half period.

On the other hand, the single-phase output coil 55 of the AC generator 50 is connected to the smoothing circuit 210 in the control-power-supply circuit as shown in FIG. 10.

This smoothing circuit 210 is configured of a rectifier diode 211 and a smoothing capacitor 215. The rectifier diode 211 is inserted between the output terminal of the single-phase output coil 55 and the smoothing capacitor 215, and the smoothing capacitor 215 is charged with the output voltage of the single-phase output coil 55 to form a DC voltage.

Incidentally, the number of the rectifier diode 211 is not limited to one as shown in FIG. 10, but sometimes four rectifier diodes are used as an all-wave rectifier bridge to charge a smoothing capacitor.

Then, the output terminal of the smoothing circuit 210 is connected to the constant-voltage circuit 235, and this constant-voltage circuit 235 generates a prescribed voltage for driving control circuits.

Further, the terminal on the − side of this constant-voltage circuit 235 is connected to the + side of the DC-power-source unit 120, and the terminal on the + side of the constant-voltage circuit 235 is connected to the voltage-limiting circuit 240, the PWM-signal-generating circuit 250 and an inverter-drive circuit 255.

This voltage-limiting circuit 240 is configured of resistors and comparators. The first reference-voltage resistor 245 and the second reference-voltage resistor 246, arranged in series, are inserted between the + side terminal of the constant-voltage circuit 235 and the + side terminal of the DC-power-source unit 120, and the midpoint between the first reference-voltage resistor 245 and the second reference-voltage resistor 246 is connected to the reference input terminal of a comparator 243. The first voltage-dividing resistor 248 and the second voltage-dividing resistor 249, arranged in series, are inserted between the + side terminal of the constant-voltage circuit 235 and the − side terminal of the DC-power-source unit 120, and the midpoint between the first voltage-dividing resistor 248 and the second voltage-dividing resistor 249 is connected to the comparing input terminal of the comparator 243.

Further, the output terminal of the comparator 243 is connected to the + side terminal of the constant-voltage circuit 235 via a control resistor 241 as well as to the gate terminal of each thyristor 111 in the DC-voltage-generating circuit 110. In connecting the output terminal of the comparator 243 to the gate terminal of each thyristor 111, it is connected via a protective resistor 117.

Therefore, this voltage-limiting circuit 240 can form a fixed reference voltage by causing the first reference-voltage resistor 245 and the second reference-voltage resistor 246 to divide a fixed voltage generated by the constant-voltage circuit 235 of the control power supply circuit. Further, this reference voltage fixed all the time can be entered into the reference input terminal of the comparator 243.

Also, a voltage resulting from the addition of the output voltage of the DC-power-source unit 120 and a fixed voltage generated by the constant-voltage circuit 235 is divided by the first voltage-dividing resistor 248 and the second voltage-dividing resistor 249 to form a detection voltage, and this detection voltage can be entered into the comparing input terminal of the comparator 243.

As a result, the detection voltage entered into the comparing input terminal varies with the voltage variations of the DC-power-source unit 120 and, if this detection voltage is lower than the reference voltage generated by the first reference-voltage resistor 245 and the second reference-voltage resistor 246, the output of the comparator 243 will be a + potential.

Therefore, the gate potentials of the thyristors 111 can be kept higher than the cathode potentials of the thyristors 111, and a gate current can be supplied to each thyristor 111 via the control resistor 241 to establish continuity of each thyristor 111. For this reason, when the output voltage of the three-phase output coil 51 becomes higher than the voltage of the DC-power-source unit 120, power is supplied to the DC-power-source unit 120 to raise the voltage of the DC-power-source unit 120.

Further, when the voltage of the DC-power-source unit 120 rises and the detection voltage entered into the comparator 243 becomes equal to the reference voltage, the output of the comparator 243 becomes 0. Therefore the gate potential of each thyristor 111 becomes equal to the cathode potential to place each thyristor 111 in a state of discontinuity.

Thus, when the voltage generated by the DC-power-source unit 120 is made lower than a fixed voltage by the voltage-limiting circuit 240, the AC generator 50 performs charging and, when the charged voltage reaches the fixed voltage, stops charging. As a result, it is possible to keep the output voltage of the DC-power-source unit 120 somewhere between 170 V and 200 V to keep the fixed voltage VD set by the voltage-limiting circuit 240 all the time.

Then, the inverter circuit 130 varies the potentials of the first output terminal 151 and the second output terminal 152 in a fixed period of 50 Hz or 60 Hz, and a single-phase AC voltage is supplied with the maximum potential difference between the voltage of the first output terminal 151 and the voltage of the second output terminal 152 being 141 V and the average voltage being 100 V.

The PWM-signal-generating circuit 250 which generates a PWM control signal for controlling this inverter circuit 130 generates the PWM control signal from a reference sine-wave such as 50 Hz, 60 Hz or the like and a triangular wave and supplies it to the inverter-drive circuit 255.

The reference sine-wave of the PWM-signal-generating circuit 250 is generated in accordance with a prescribed frequency, such as 50 Hz or 60 Hz, which is the frequency of the voltage supplied from the output terminal. This PWM-signal-generating circuit 250 regulates the ratio between the voltage of the reference sine-wave and the voltage of the triangular wave, and determines the frequency, pulse width and the quantity of width variation of the pulse signal, which is used as the PWM control signal according to the output voltage VD of the DC-power-source unit 120 entered into the inverter circuit 130 and the characteristics of the inverter circuit 130 and the low pass filter 140.

Further this portable generator 100 is provided with the overload-detecting circuit 260, wherein a detecting resistor 261 is inserted between the DC-power-source unit 120 and the inverter circuit 130.

This overload-detecting circuit 260 is configured of the detecting resistor 261 and an arithmetic-circuit unit 265. When having detected an amperage surpassing the rated amperage, this overload-detecting circuit 260 supplies a stop signal to the inverter-drive circuit 255 according to the extent of surpassing the rating with the time factor also taken into account.

This arithmetic-circuit unit 265 uses various circuits having comparators, capacitors and resistors. It takes into account the characteristics of the elements constituting the power circuit and, in many cases, immediately issues a stop signal when a current of double the rated amperage flows to stop the output of the inverter-drive circuit 255 from supplying the first PWM signal and the second PWM signal. The arithmetic-circuit unit 265 is designed to issue a stop signal to the inverter-drive circuit 255 when it has detected a current slightly surpassing the rated amperage and this current flow has continued for several seconds to several minutes.

In this portable generator 100, in which a three-phase AC voltage once rectified by the DC-voltage-generating circuit 110 and the DC voltage generated by the DC-power-source unit 120 is again converted into an AC voltage by the inverter circuit 130 can generate an AC output voltage whose frequency and voltage are stable all the time while forming a power matching the load by varying the revolutions of the AC generator 50, i.e. revolutions of the engine.

Therefore, this portable generator 100 can adjust the engine revolutions to load variations, increase the revolutions when the load is heavy, and decrease the revolutions when the load is light, thereby making it sufficient for the engine to generate the quantity of energy that the load requires, accordingly can readily adjust the output to the load level, and therefore operate efficiently.

When it becomes overloaded beyond the rated output, the generator can stop the inverter circuit 130 from operating promptly or after the lapse of a prescribed length of time, bring down the output voltage to 0, and operate various electric devices with which the generator is loaded within an extent of several kilowatts, which is its rated output, while maintaining the overall safety of the circuitry.

Thus, the engine-driven portable generator 100 using the inverter circuit 130, for its capability to supply single-phase AC power of 100 V as does a commercial power source, has come to be used for supplying power to various electrical devices in general.

SUMMARY OF THE INVENTION

However, the above-described engine-driven portable generator (100) using an inverter may apply a DC voltage to electrical devices connected to it and thereby damage the devices because a DC voltage remains at its output terminals (151, 152) even after the engine is stopped.

Moreover, when anything of low impedance or low resistance is inadvertently brought into contact with the output terminals when the engine is not running, short circuiting may occur.

The present invention is intended to obviate these disadvantages, and to ensure that any residual voltage at two output terminals (151, 152) is eliminated when a portable generator (100) is stopped from providing an output.

Thus, the invention provides a portable generator (100) turning an AC generator (50) by an engine to form an AC voltage, once rectifying the AC voltage into a DC voltage, converting the DC voltage into a fixed single-phase AC voltage of a prescribed frequency by an inverter circuit (130), and outputting the single-phase AC voltage, via a low pass filter (140), through output terminals (151, 152); which includes an output-stop-control unit (443) for stopping the inverter circuit (130) at the time when the outputted single-phase AC voltage, by an operating switch (305) being turned off, drops to 0 V.

Thus, because the operation of the inverter circuit (130) is stopped at the time when the voltage between the output terminals drops to 0 V, the charge accumulated in the capacitor of a low pass filter (140) provided following the inverter circuit (130) can be reduced substantially to 0, and the voltage generating at the output terminals (151, 152) when the portable generator (100) stops can be eliminated.

BRIEF DESCRIPTION OF THE DRAWINGS

FIG. 11 is schematic diagrams of output voltages.

DETAILED DESCRIPTION

In the portable generator according to the present invention, an AC generator is turned by an engine developing an output several kilowatts to 10 kW, a three-phase output voltage of the AC generator is once rectified into a DC voltage, and the DC voltage is converted into a single-phase AC voltage of a prescribed frequency by an inverter circuit. It is intended to be a portable generator as a small power source to be frequently moved from one position to another in the place of its use or operated in a fixed installed state in the place of its use where it is brought into.

Figure 1:
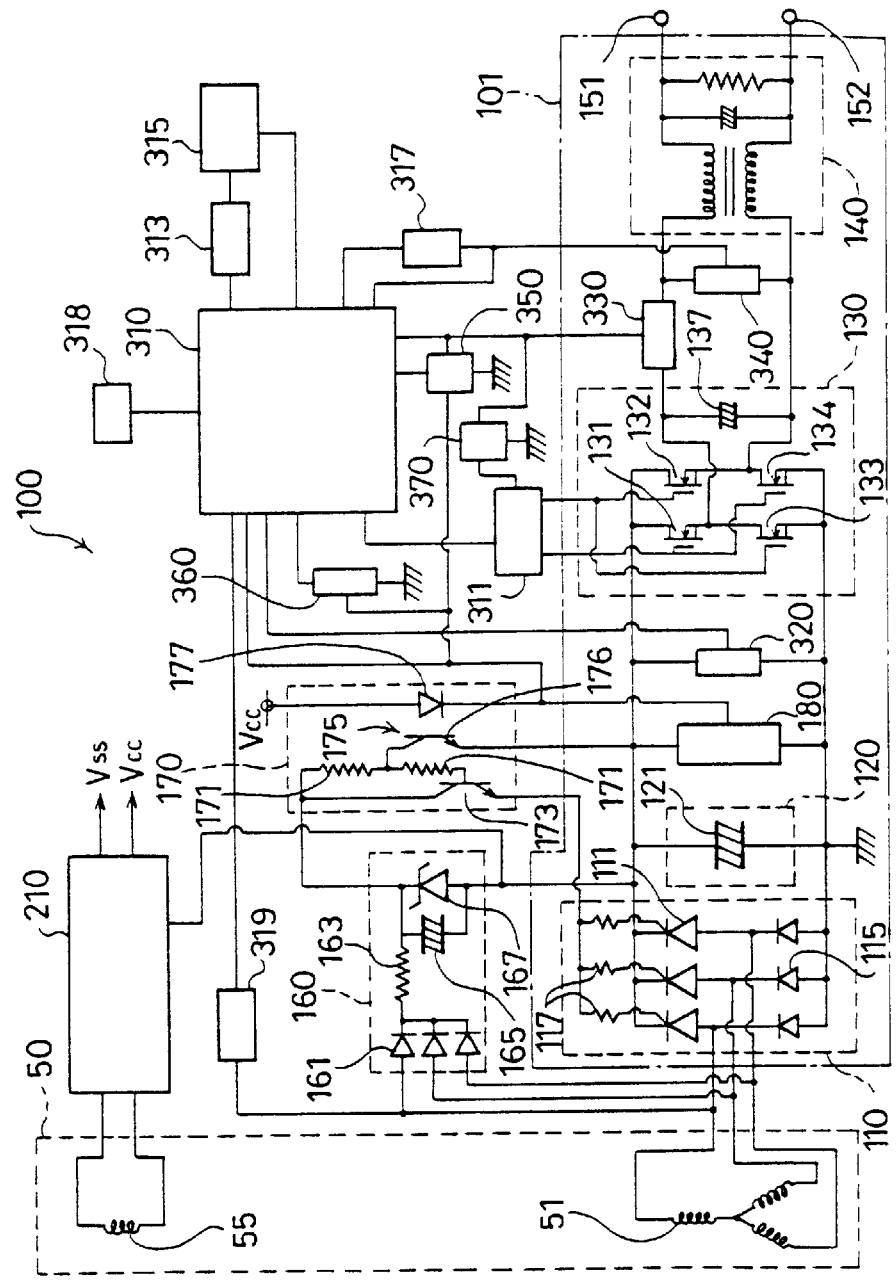
FIG. 1 is a block diagram showing an overall view of a portable generator according to the present invention.

This portable generator has an AC generator 50 whose rotor is turned by an engine and, as shown in FIG. 1, has a power circuit 101 mainly comprising a DC-voltage-generating circuit 110, a DC-power-source unit 120, an inverter circuit 130 and a low pass filter 140. The portable generator 100 further has a microcomputer as a central control unit 310 for setting the frequency of the output voltage supplied from the output terminals of the power circuit 101 and for controlling the whole of the portable generator 100 on the basis of detection signals from detecting circuits provided in different parts, and has a control-power-source unit 201 for forming operational powers for these control unit and detecting circuits.

This central control unit 310 sets the frequency of the output voltage to a prescribed fixed frequency such as 50 Hz or 60 Hz with a setting switch 318. It controls the operation of the inverter circuit 130 on the basis of detection signals from a DC-voltage-detecting circuit 320, an output-currentdetecting circuit 330 and an output-voltage-detecting circuit 340 provided in the power circuit 101, and also controls the opening and closing of an engine throttle on the basis of a detection signal from a revolution-frequency-detecting circuit 319 and an opening degree signal from a throttle-control mechanism 315.

The setting switch 318 is also enabled to regulate and set the output voltage as well as to set the frequency. There also is provided an operating switch 305, such as an output switch, for starting and stopping the supply of a single-phase AC voltage from a first output terminal 151 and a second output terminal 152.

The AC generator 50 in this portable generator 100 has a three-phase output coil 51 and a single-phase output coil 55, and the three-phase output coil 51 is connected to the power circuit 101 while the single-phase output coil 55 is connected to the control-power-source unit 201.

The output terminals of the three-phase output coil 51, as shown in FIG. 1, are connected to the DC-voltage-generating circuit 110 comprising a rectifier bridge using three rectifier diodes 115 and three thyristors 111 as well as to a gate-voltage-generating circuit 160.

This DC-voltage-generating circuit 110 connects the connecting point between the cathode of each rectifier diode 115 and the anode of each thyristor 111 to each output terminal of the three-phase output coil 51, connects the anodes of the rectifier diodes 115 collectively to the − side terminal of the DC-power-source unit 120 and to the inverter circuit 130, and connects the cathodes of the thyristors 111 collectively to the + side terminal of the DC-power-source unit 120 and to the inverter circuit 130.

Moreover, the gate-voltage-generating circuit 160 connected to the output terminals of the three-phase output coil 51 is formed of a rectifier diode, a limiting resistor, a power supply capacitor and a Zener diode.

Thus, the output terminals of the three-phase output coil 51 are connected to the anodes of the rectifier diode 161; the cathodes of the rectifier diodes 161 are commonly connected to the + side terminal of a power supply capacitor 165 via a limiting resistor 163; the − side terminal of the power supply capacitor 165 is connected to the + side of the DC-power-source unit 120; and a Zener diode 167 is connected in parallel to the power supply capacitor 165.

Therefore, this gate-voltage-generating circuit 160 can form and supply a voltage higher than the voltage of the + side terminal of the DC-power-source unit 120 by the normal voltage of Zener diode 167.

The output terminals of this gate-voltage-generating circuit 160 are connected to the gate terminals of the thyristors 111 in DC-voltage-generating circuit 110 via a thyristor-control circuit 170.

This thyristor-control circuit 170 is formed of a switching transistor 173, a switching-control resistor 171 and a photocoupler 175.

Thus, the collector of a PNP transistor as the switching transistor 173 is connected to the output terminal of the gate-voltage-generating circuit 160, and the emitter of the switching transistor 173 is connected to the gate terminal of each thyristor 111. In connecting the emitter to the gate terminal of each thyristor 111, the connection is accomplished by using the protective resistor 117.

The base of the switching transistor 173 is connected to the output terminal of the gate-voltage-generating circuit 160 via the switching-control resistor 171, and the midpoint of the switching-control resistor 171 is connected to the + side terminal of the DC-power-source unit 120 via a phototransistor 176 of the photocoupler 175.

The collector of the phototransistor 176 of the photocoupler 175 is connected to the midpoint of the switching-control resistor 171 and the emitter thereof to the + side terminal of the DC-power-source unit 120. The anode of a light emitting diode 177 of the photocoupler 175 is connected to the output terminal of a second control voltage Vcc in the control-power-source unit 201 and the cathode thereof to a constant-voltage-detecting circuit 180, a stopping circuit 360 and an over current-detecting circuit 350.

Therefore, when the light emitting diode 177 of the photocoupler 175 is turned on, this thyristor-control circuit 170 places the phototransistor 176 in a state of continuity, brings down the midpoint potential of the switching-control resistor 171 to the + side terminal voltage of the DC-power-source unit 120, and places the switching transistor 173 in a state of discontinuity. When the light emitting diode 177 is not turned on, it places the switching transistor 173 in a state of continuity. Therefore, the output current of the gate-voltage-generating circuit 160 is supplied to each thyristor 111 as the gate current of the thyristor 111, and this gate current used as a continuity signal can place each of the thyristors 111 in the DC-voltage-generating circuit 110 in a state of continuity.

For this reason, it is possible to supply the output power of the three-phase output coil 51 to the DC-power-source unit 120 connected to the both output terminals of the DC-voltage-generating circuit 110.

The inverter circuit 130 connected to the both output terminals of the DC-voltage-generating circuit 110 is configured of a bridge circuit comprising a power transistor and a smoothing capacitor 137.

This inverter circuit 130 connects the first transistor 131 and the third transistor 133 in series to the DC-power-source unit 120 and also connects the second transistor 132 and the fourth transistor 134 in series to the DC-power-source unit 120. Further, the midpoint between the first transistor 131 and the third transistor 133 is connected to the first output terminal 151 via the low pass filter 140 formed of a coil, a capacitor and a resistor, and the midpoint between the second transistor 132 and the fourth transistor 134 is also connected to the second output terminal 152 via the low pass filter 140.

Figure 2:
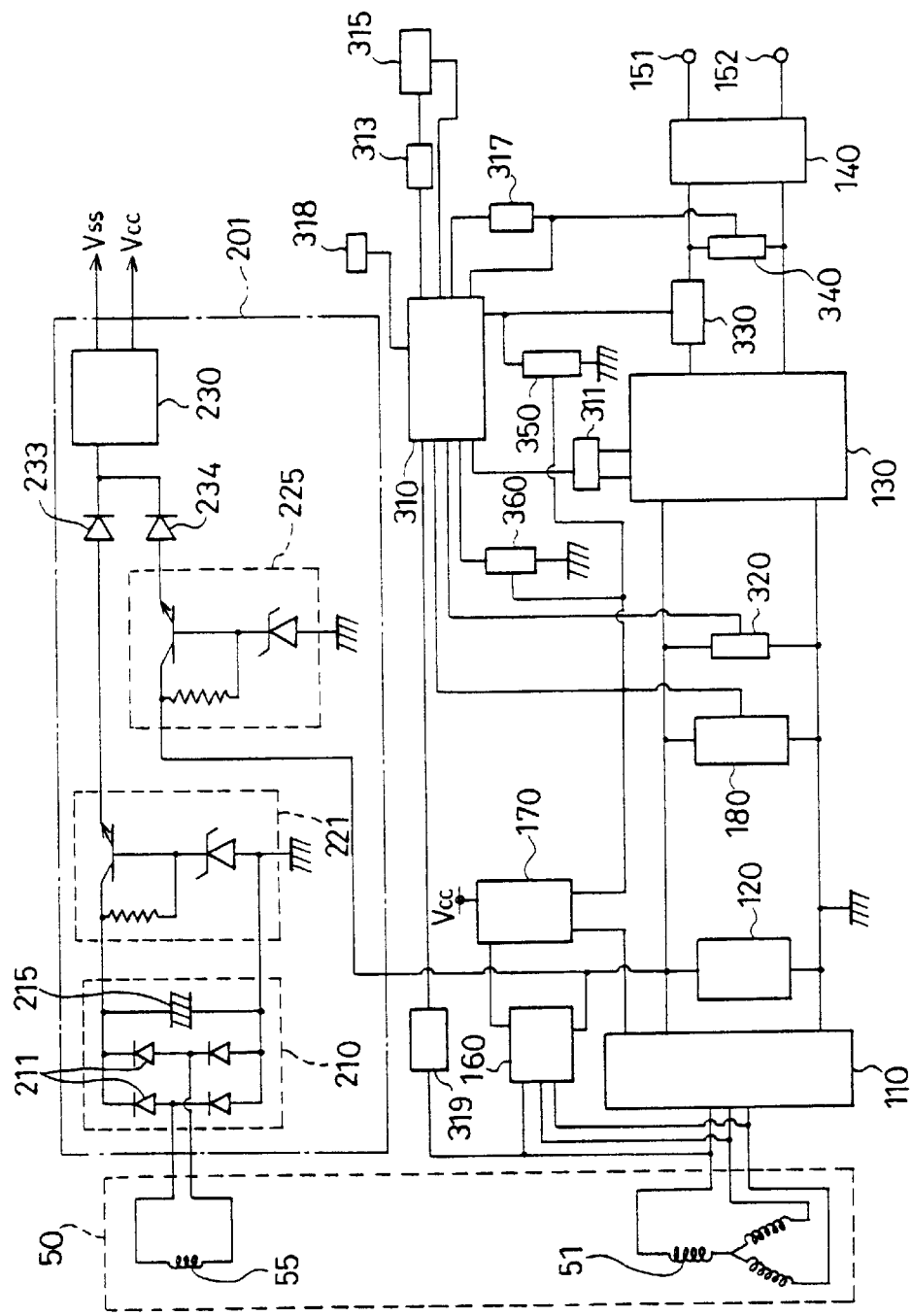
FIG. 2 is a circuit block diagram mainly of the power-supply unit of the portable generator according to the invention.

Moreover, the single-phase output coil 55 of the AC generator 50, as shown in FIG. 2, is connected to the smoothing circuit 210 of the control-power-source unit 201. This smoothing circuit 210 performs all-wave rectification with a bridge rectifier circuit using four rectifier diodes 211 and charges the smoothing capacitor 215.

This control-power-source unit 201 has, in addition to the smoothing circuit 210, a first constant-voltage circuit 221, a second constant-voltage circuit 225 and a regulator 230. It converts the output voltage of the smoothing circuit 210 into a fixed voltage of around 15 V with the first constant-voltage circuit 221, and applies this fixed voltage to the regulator 230 via a first anti-reverse diode 233. This control-power-source unit 201 also converts a voltage of the + side terminal of the DC-power-source unit 120 into a fixed voltage of around 12 V with the second constant-voltage circuit 225, and applies this fixed voltage to the regulator 230 via a second anti-reverse diode 234.

The regulator 230, forming a first control voltage Vss of around 10 V and a second control voltage Vcc of around 5 V, drives a motor controlling the engine throttle to be described afterwards with the first control voltage Vss, supplies the second control voltage Vcc to the central control unit 310 and other control circuit elements.

To add, this control-power-source unit 201 usually supplies the regulator 230 with a DC voltage generated by the smoothing circuit 210 and the first constant-voltage circuit 221 from the AC voltage supplied by the single-phase output coil 55. Further, it generates the first control voltage Vss and the second control voltage Vcc with the regulator 230, and supplies them to each circuit element. When disconnection or some other trouble arises in the single-phase output coil 55 or elsewhere, if the DC-power-source unit 120 is in operation, the second constant-voltage circuit 225 supplies power to the regulator 230, which is then caused to supply the first control voltage Vss and the second control voltage Vcc to keep the portable generator 100 operating.

Moreover, a switching circuit for detecting the output voltage of the first constant-voltage circuit 221 and for performing a change-over may be arranged on the input side of the regulator 230 in place of the first anti-reverse diode 233 and the second anti-reverse diode 234. In this case, while keeping the output voltage of the first constant-voltage circuit 221 and the output voltage of the second constant-voltage circuit 225 equal, power from the first constant-voltage circuit 221 is usually supplied to the regulator 230 and, when the output of the first constant-voltage circuit 221 has stopped, the switching circuit may be changed over to supply the output voltage from the second constant-voltage circuit 225 to the regulator 230. Further, using an AC generator 50 having no single-phase output coil 55, the smoothing circuit 210 and the first constant-voltage circuit 221 may be omitted, the voltage of the DC-power-source unit 120 may be lowered by the second constant-voltage circuit 225 and the power from the DC-power-source unit 120 may be supplied to the regulator 230 all the time thereby to form a control voltage.

Figure 3:
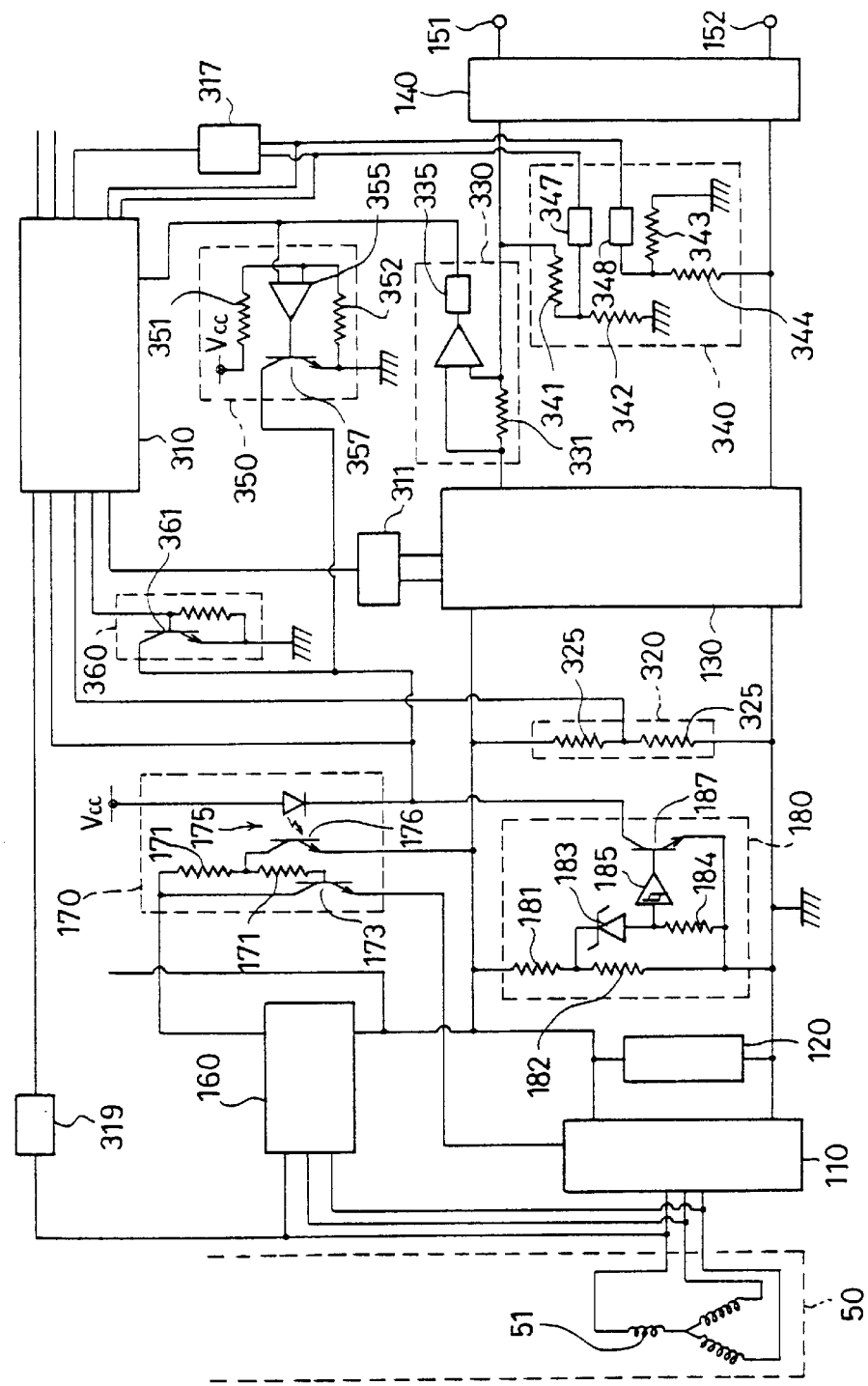
FIG. 3 is a circuit block diagram mainly of the detecting circuit of the portable generator according to the invention.

The constant-voltage-detecting circuit 180 for controlling the voltage of the DC-power-source unit 120, as shown in FIG. 3, uses resistors, a Zener diode and a switching transistor. Thus the voltage of the DC-power-source unit 120 is divided by voltage-dividing resistors 181, 182 comprising two resistors arranged in series, and the midpoint potential of the voltage-dividing resistors 181, 182 is further lowered by a Zener diode 183 and a detecting resistor 184. The potential of the detecting resistor 184 is entered into a Schmitt circuit 185 to control the continuity of a switching transistor 187.

Further, the switching transistor 187 of this constant-voltage-detecting circuit 180 is arranged in a serial relationship to the light emitting diode 177 of the photocoupler 175 in the thyristor-control circuit 170, and applies the second control voltage Vcc to the light emitting diode 177 to which it is in a serial relationship, and controls the turning-on of the light emitting diode 177 by intercepting the continuity of the switching transistor 187.

Therefore, in this constant-voltage-detecting circuit 180, when the output voltage of the DC-power-source unit 120 rises, the detection potential of the detecting resistor 184 also rises, and establishment of the continuity of the switching transistor 187 causes the light emitting diode 177 to be turned on. AS a result, the thyristor-control circuit 170 stops supplying a continuity signal to the DC-voltage-generating circuit 110 and places each thyristor 111 of the DC-voltage-generating circuit 110 in a state of discontinuity to stop power supply from the AC generator 50 to the DC-power-source unit 120.

Moreover, this constant-voltage-detecting circuit 180, when the voltage of the DC-power-source unit 120 drops, places the switching transistor 187 in a state of discontinuity, and causes a continuity signal to be supplied from the thyristor-control circuit 170 to place each thyristor 111 of the DC-voltage-generating circuit 110 in a state of continuity.

In this manner, the constant-voltage-detecting circuit 180 can keep the potential of the DC-power-source unit 120 constant all the time.

Then, a DC-voltage-detecting circuit 320 connects a voltage-dividing resistor 325 to be inserted between the both terminals of the DC-power-source unit 120, and this voltage-dividing resistor 325 divides the output voltage of the DC-power-source unit 120, and enters the output voltage of the DC-power-source unit 120 into the central control unit 310 as a DC voltage signal.

Moreover, the output-voltage-detecting circuit 340 inserted between the inverter circuit 130 and the low pass filter 140 divides and lowers the first output voltage and the second output voltage of the inverter circuit 130 each with a voltage-dividing resistor to carry out voltage detection. A first detection voltage resulting from the division of this first output voltage by voltage-dividing resistors 341, 342 and a second detection voltage resulting from the division of the second output voltage by voltage-dividing resistors 343, 344 are entered into the central control unit 310 via detecting low pass filters 347, 348, respectively, as output voltage signals.

Then, in entering output voltage signals supplied from the output-voltage-detecting circuit 340 into the central control unit 310, a first output voltage signal and a second output voltage signal, both of which are analog signals, are entered into the central control unit 310, and a zero cross signal from a square-wave-forming circuit 317 is also entered into the central control unit 310.

This square-wave-forming circuit 317 generates a square wave as the zero cross signal based on the differential voltage between the first output voltage and the second output voltage both forming a sine-wave. Then, in forming the square wave, it uses the zero cross point at the differential voltage between the first output voltage and the second output voltage both forming a sine-wave as an edge of this square wave. Therefore, the square-wave-forming circuit 317 generates a zero cross signal indicating the timing of the zero cross point in the output voltage supplied from the portable generator 100, and enters it into the central control unit 310.

Further, the output-current-detecting circuit 330 detects, with a detecting resistor 331, a current flowing from the inverter circuit 130 to the low pass filter 140, and enters an output current signal cleared of harmonic contents by using a detecting low pass filter 335 into the central control unit 310 and the overcurrent-detecting circuit 350.

Incidentally, the output-current-detecting circuit 330 may be provided on the input side of the inverter circuit 130. When this output-current-detecting circuit 330 is provided on the input side of the inverter circuit 130, especially when the output-current-detecting circuit 330 is provided between the − side terminal of the DC-power-source unit 120 and the inverter circuit 130, it is made easier to reduce the absolute voltage of the output current signal supplied from the output-current-detecting circuit 330.

Moreover, as the output-current-detecting circuit 330, not only the detecting resistor 331 but also a current detector having an induction coil may be used.

Then, the overcurrent-detecting circuit 350 is formed of resistors 351, 352, a comparator 355 and a switching transistor 357. This overcurrent-detecting circuit 350 generates a reference voltage by dividing, with the voltage-dividing resistors 351, 352 for reference voltage generation, the second control voltage Vcc generated by the control-power-source unit 201 and, when the potential of the output current signal supplied by the output-current-detecting circuit 330 becomes higher than the reference voltage, establishes continuity of the switching transistor 357.

Further, the emitter of this switching transistor 357 is grounded, and the collector thereof is connected to the cathode of the light emitting diode 177 in the photocoupler 175. Therefore, this overcurrent-detecting circuit 350 causes the thyristor-control circuit 170 to stop supplying the continuity signal when continuity of the switching transistor 357 is established.

Incidentally, into the central control unit 310, the DC voltage from the DC detecting circuit 320, the output current signal from the output-current-detecting circuit 330, the output voltage signal from the output-voltage-detecting circuits 340 and the zero cross signal from the square-wave-forming circuit 317 based on this output voltage signal are entered as detection signals, as well as the detection signal for the frequency of the output voltage supplied by the three-phase output coil 51 as the revolution frequency signal from the revolution-frequency-detecting circuit 319. Furthermore, the cathode potential of the light emitting diode 177 is also entered as the conductivity rate detection signal, and the throttle opening degree signal is also entered from the throttle-control mechanism 315. However, the opening degree signal from the throttle-control mechanism 315 may sometimes be omitted.

Figure 4:
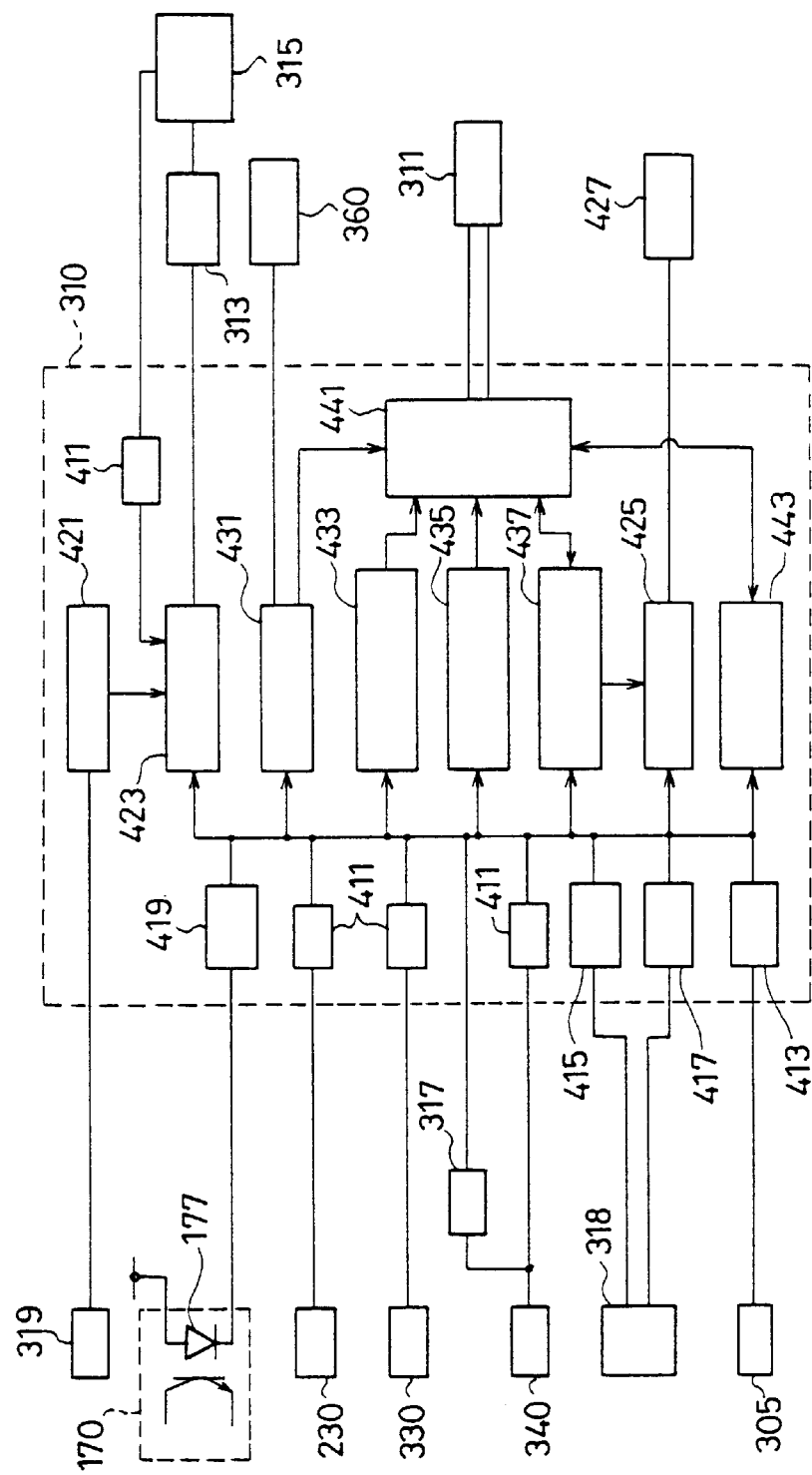
FIG. 4 is a block diagram schematically showing the central control unit of the portable generator according to the invention.

The central control unit 310 into which these detection signals are entered has, as a function of its microcomputer, as shown in FIG. 4, in addition to a PWM-signal-generating unit 441 for supplying a PWM control signal to a PWM driver, an independent-operation-control unit 435 and a synchronous-operation-control unit 437 for distinguishing between independent operation and parallel operation at the time of starting control according to the output voltage signal from the output-voltage-detecting circuits 340 and the zero cross signal from the square-wave-forming circuit 317 and for controlling the PWM-signal-generating unit 441. Further, formed are an output-frequency-setting unit 415 for setting the frequency of the single-phase AC voltage in accordance with a signal from the setting switch 318, an output-voltage-setting unit 417 for regulating and setting the output voltage of the single-phase AC voltage in accordance with a signal from the setting switch 318, and an output-stop-control unit 443 for detecting the state of the operating switch 305 and for stopping the PWM-signal-generating unit 441 at the timing of a prescribed output state. Then, in the central control unit 310 are formed a voltage-waveform-monitoring unit 433 for monitoring the single-phase AC voltage supplied from the first output terminal 151 and the second output terminal 152 in accordance with an output voltage signal from the output-voltage-detecting circuit 340, an engine-speed-detecting unit 421 for judging the engine revolutions according to a revolution frequency signal from the revolution-frequency-detecting circuit 319, and a throttle-opening-control unit 423 for supplying a revolution control signal to a throttle driver 313 on the basis of the output current signal, the revolution frequency signal and the opening degree signal from the throttle-control mechanism 315. Moreover, in the central control unit 310 are formed a circuit-protecting unit 431 for supplying a stop control signal to the stopping circuit 360 on the basis of an output current signal from the output-current-detecting circuit 330 and a DC voltage signal from the DC-voltage-detecting circuit 320, a continuity-rate-detecting unit 419 for detecting the continuity rate of the thyristors 111 in the DC-voltage-generating circuit 110 from the cathode potential of the light emitting diode 177 in the thyristor-control circuit 170, and a display-control unit 425 for supplying signals to have the operating state of the portable generator 100 displayed on an operating-state-display unit 427 according to the state of control operation of the central control unit 310.

To add, this central control unit 310 as a microcomputer, though not shown, has a quartz oscillator of well over 10 M Hz in oscillation frequency, and operates according to the output of this quartz oscillator as the reference clock, and has a read-only memory (ROM) for storing control programs, control data tables and the like, a random access memory (RAM) for performing arithmetic processing, and a frequency-dividing circuit for dividing the frequency of the reference clock to generate required clock signal. Moreover, the central control unit 310 is also provided with an analog-to-digital converter 411 for converting inputted analog signals into digital signals.

Moreover, when the throttle-control mechanism 315 is to control the rotation of the throttle valve by using a pulse motor, a pulse counter may be built into the throttle-opening-control unit 423 of the central control unit 310, and the pulse counter would be counted up or down according to a revolution control signal supplied from the throttle-opening-control unit 423 to the throttle driver 313, so that the opening degree signal from the throttle-control mechanism 315 could be omitted and that the throttle opening degree could be stored in the throttle-opening-control unit 423 instead.

Then, the PWM-signal-generating unit 441 has a PWM reference table, and supplies a PWM control signal to a PWM driver 311 in accordance with this PWM reference table to control continuity and discontinuity of transistors in the inverter circuit 130, as the first transistor 131 to the fourth transistor 134.

This PWM reference table contains many PWM reference values, which consists of one hundred to several hundreds of values corresponding to the values of a curve constituting one period of a sine-curve.

Then, the PWM-signal-generating unit 441 of the central control unit 310 successively reads PWM reference values out of this PWM reference table in a fixed period to form a PWM control signal, and supplies this PWM control signal to the PWM driver 311.

This PWM control signal, when the leading value in the PWM reference table is 0, is generated, by adding the value equivalent to a half of one clock time in the read clock for reading PWM reference values to each PWM reference value that has been read out, as a pulse signal whose duty ratio is 50% when the PWM reference value is 0. For this reason, each pulse of PWM control signals undergoes successive variations in duty ratio to match the shape of the sine-wave, so that the duty ratio of the pulse signal successively varies in a range of several tens of percent to several tens of percent before 100% around a center value of 50%, and that such pulse signals constitute a string in which the duty ratio varies in the shape of the reference sine-wave.

Then, the PWM driver 311 amplifies the current of this PWM control signal to form a first PWM signal to be supplied to the first transistor 131 and the fourth transistor 134, also inverts and amplifies this PWM control signal to form a second PWM signal to be supplied to the second transistor 132 and the third transistor 133, and supplies the first PWM signal and the second PWM signal to the inverter circuit 130.

Further, the voltage-waveform-monitoring unit 433 of the central control unit 310 has an output voltage table for storing many voltage table values respectively matching the PWM reference values. Then, at the timing at which the PWM-signal-generating unit 441 reads PWM reference values out of the PWM reference table, the voltage-waveform-monitoring unit 433 reads voltage table values out of the output voltage table, and compares the read voltage table values with output voltages entered from the output-voltage-detecting circuit 340. Further, on the basis of the result of this comparison, the voltage-waveform-monitoring unit 433 causes the PWM-signal-generating unit 441 to correct the pulse width of each pulse signal as the PWM control signal to be supplied by the PWM-signal-generating unit 441, and thereby regulates the output voltage.

Then, when a required length of time has passed since the engine began turning and the output of the single-phase AC voltage is to start, or when an output start switch as the operating switch 305 is manipulated and the PWM control signal is supplied from the PWM-signal-generating unit 441 to start the output of the single-phase AC voltage from the first output terminal 151 and the second output terminal 152, the central control unit 310 judges whether or not the zero cross signal from the square-wave-forming circuit 317 has been entered and, if zero cross signal has not been entered, starts the operation of the independent-operation-control unit 435.

The start of the operation of,this independent-operation-control unit 435 causes the PWM-signal-generating unit 441 of the central control unit 310 to supply a PWM control signal to form such a voltage that the average output voltage between the first output terminal 151 and the second output terminal 152 is 100 V or the like as set by the setting switch 318 and the frequency is 50 Hz or 60 Hz as set.

The frequency of this output voltage determines the frequency of the single-phase AC voltage supplied by the portable generator 100 according to whether to select a clock to read 100 to several hundreds of PWM reference values, which are recorded in the PWM reference table of the PWM-signal-generating unit 441 and which constitute a one-period equivalent of the single-phase AC voltage, in 20 msec or another clock to read them in 16.66 msec.

Moreover, in setting the output voltage, PWM reference values recorded in the PWM reference table are multiplied by a correction factor to form corrected reference values, and the pulse width of a pulse signal as the PWM control signal is determined on the basis of this corrected reference value. Then, the independent-operation-control unit 435 reads, from the output-voltage-setting unit 417, the correction factor for calculating the corrected reference values from these PWM reference values, and hands over this correction factor to the PWM-signal-generating unit 441.

Further, after the PWM-signal-generating unit 441 supplies the PWM control signal, the voltage-waveform-monitoring unit 433 monitors the peak voltage and the distortion of the sine-wave on the basis of the output voltage signal from the output-voltage-detecting circuit 340, and if the peak voltage varies from its setpoint, a correction factor for correcting the difference from the set voltage is caused to be read from the voltage-waveform-monitoring unit 433 into the PWM-signal-generating unit 441. Moreover, if the distortion of the sine-wave is sustained, a single-phase AC voltage, which has been set by having a correction factor read into the PWM-signal-generating unit 441 to provide a smooth sine-wave, caused to be supplied.

Incidentally, during the infinitesimal length of time from the time a pulse signal whose duty ratio is 50% is supplied as the PWM control signal from the central control unit 310 until an output voltage signal representing an output voltage of 0 is entered into the central control unit 310 in response to this pulse signal, voltage table values preset according to the circuit characteristics of the inverter circuit 130 and the like are compared with the detected output voltage. However, this infinitesimal difference in length is not always fixed but may be corrected in accordance with a zero cross signal entered from the square-wave-forming circuit 317 to appropriately adjust the relationship of the PWM control signal to the output voltage supplied to the first output terminal 151 and the second output terminal 152.

Moreover, in starting the output of the PWM control signal from the PWM-signal-generating unit 441, when a zero cross signal is entered from the square-wave-forming circuit 317 into the central control unit 310, the central control unit 310 starts the operation of the synchronous-operation-control unit 437.

This synchronous-operation-control unit 437 first judges, according to the entry intervals of the zero cross signal, whether or not the frequency of the voltage generated between the first output terminal 151 and the second output terminal 152 is identical with the frequency set by the setting switch 318.

Then, when the frequency is identical, the unit judges, according to the output voltage signal, whether or not the peak voltage is substantially equal to the peak level of the voltage set by the setting switch 318.

In this way, the voltage generated between the first output terminal 151 and the second output terminal 152 is compared with the frequency and the voltage set by the setting switch 318 and, if it is found not to be identical with the respective setpoints, an abnormality signal is issued to the display-control unit 425 without starting the operation of the PWM-signal-generating unit 441, and a required display signal is issued from the display-control unit 425 to the operating-state-display unit 427.

Moreover, when the frequency and the voltage are found to be identical with the respective setpoints, the PWM-signal-generating unit 441 is caused to start operating at the rising of the zero cross signal from the square-wave-forming circuit 317, and PWM reference values are read out of the PWM reference table from the top position onward to start supplying the PWM control signal.

Therefore, the inverter circuit 130 is actuated, the supply of single-phase AC voltage is started via the low pass filter 140, and this single-phase AC voltage and the AC voltage entered between the first output terminal 151 and the second output terminal 152 are made identical in phase and voltage level to enable the portable generator 100, which is an AC power-supply unit, to start supplying the AC voltage.

Figure 5:
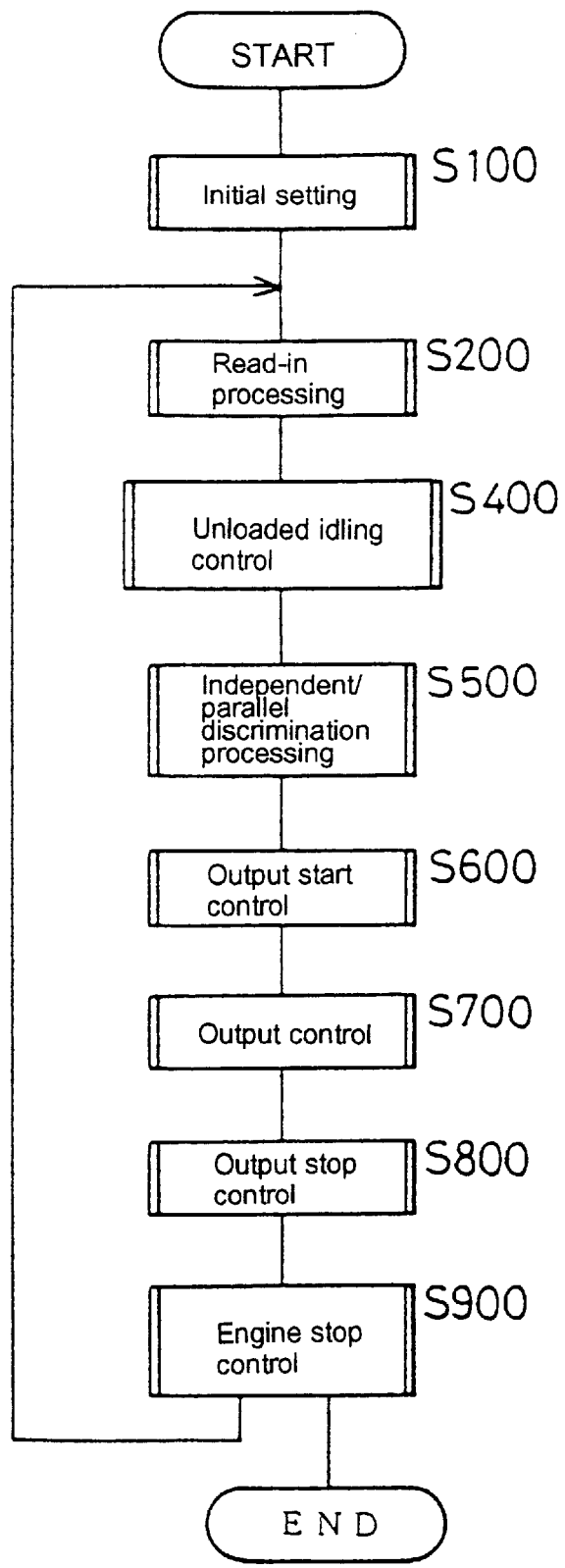
FIG. 5 is a flow chart showing the whole control operation of the portable generator according to the invention.

The operation of this central control unit 310 will be described as follows with focus on the start of supplying the single-phase AC voltage. When the engine revolution is started either manually or with a start switch and the three-phase output coil and the single-phase output coil subsequently start turning, the central control unit 310 first performs initial setting of a microcomputer (S100), as the central control unit 310, as shown in FIG. 5.

Then, as stated above, read processing (S200) is done to read signals from the setting switch 318 and various detecting circuits and unloaded idling control (S400) is performed. Further, independent/parallel discrimination processing (S500) is performed according to the stability of engine revolution and the like and, if the output switch as the operating switch 305, is on, output start control (S600) and output control (S700) for the single-phase AC voltage from the output terminal are performed to supply the single-phase AC voltage as a prescribed set voltage and as a required frequency between the first output terminal 151 and the second output terminal 152. Then output stop control (S800) is performed at the occurrence of abnormality occurs, and, if necessary, engine stop control (S900) is performed. When the operating switch 305 is turned off, output stop control (S800) and, if necessary, engine stop control (S900) are performed.

Figure 6:
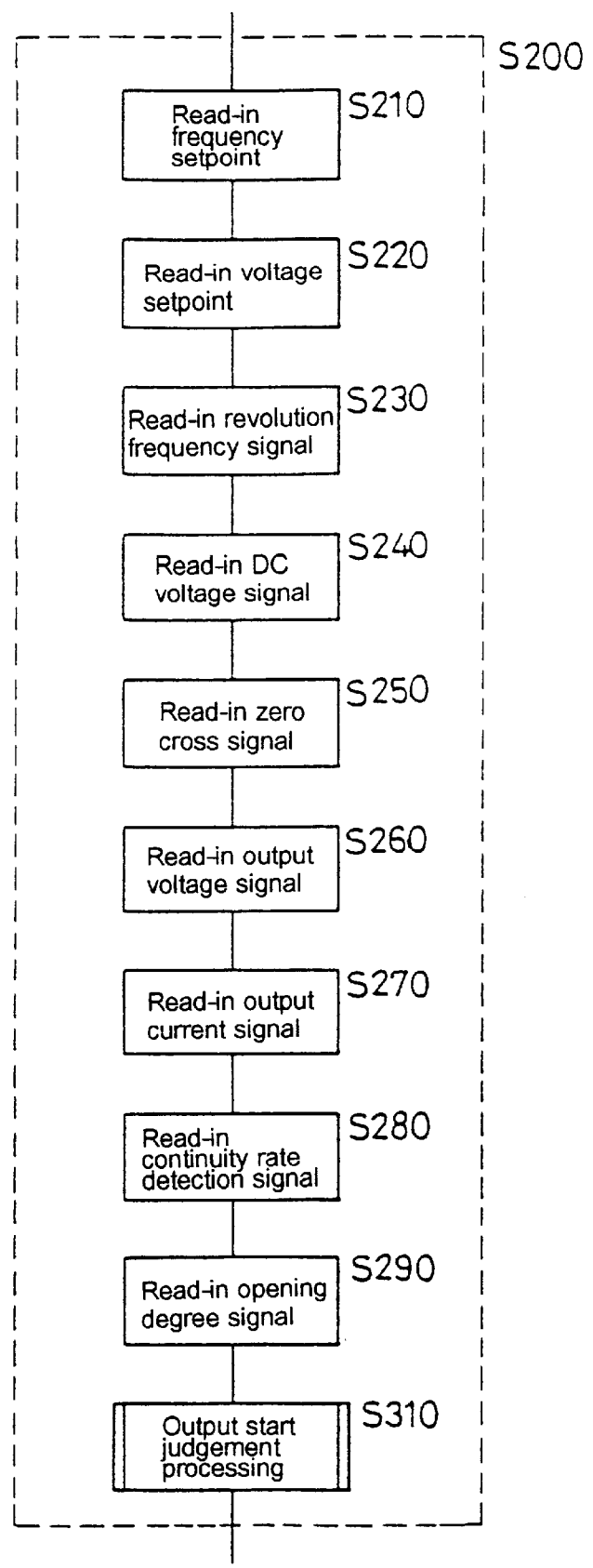
FIG. 6 is a flow chart showing the read-in processing in the control operation by the portable generator according to the invention.

This read-in processing (S200), as shown in FIG. 6, is to perform a read-in of a frequency setting signal entered from a frequency setting switch among the setting switch 318 into the output-frequency-setting unit 415 (S210), a read-in of a voltage setting signal entered from a voltage setting switch among the setting switch 318 into the output-voltage-setting unit 417 (S220), a read-in of a revolution frequency signal entered from the revolution-frequency-detecting circuit 319 into the engine-speed-detecting unit 421 (S230), a read-in of a DC voltage signal entered from DC-voltage-detecting circuit 320 into the circuit-protecting unit 431, the independent-operation-control unit 435 and the synchronous-operation-control unit 437 (S240), a read-in of a zero cross signal entered from the square-wave-forming circuit 317 into the voltage-waveform-monitoring unit 433, the independent-operation-control unit 435 and the synchronous-operation-control unit 437 (S250), a read-in of an output voltage signal entered from the output-voltage-detecting circuit 340 into the circuit-protecting unit 431, the voltage-wave form-monitoring unit 433, the independent-operation-control unit 435 and the synchronous-operation-control unit 437 (S260), a read-in of an output current signal entered from the output-current-detecting circuit 330 into the throttle-opening-control unit 423, the circuit-protecting unit 431, the independent-operation-control unit 435 and the synchronous-operation-control unit 437 (S270), a read-in of a continuity rate detection signal for a read-in of the ratio of stop signals entered into the continuity-rate-detecting unit 419 (S280), and a read-in of an opening degree signal entered from the throttle-control mechanism into the throttle-opening-control unit 423 (S290), and subsequently performs output start judgement control (S310).

Incidentally, in the read-in of a zero cross signal (S250), when the zero cross signal is entered, a zero cross flag is set, and a timer counter is started to begin measuring the input period of the zero cross signal.

Then, on the basis of the read-in of the revolution frequency signal (S230) and the read-in of the opening degree signal (S290) performed in this read-in processing (S200), unloaded idling control (S400) to turn the engine at a stable frequency of idling revolutions is carried out with the throttle-opening-control unit 423.

This unloaded idling control (S400) is performed in conjunction with the execution of read-in processing (S200) while independent/parallel discrimination processing (S500), output start control (S600), output control (S700), output stop control (S800) and engine stop control (S900) are passed successively. Moreover, this unloaded idling control (S400) is also performed when the PWM-signal-generating unit 441 is not working or when 0 has appeared consecutively as the value of the output amperage signal entered from the output-current-detecting circuit 330.

Then, to start the output of the single-phase AC voltage from the output terminal when after a prescribed length of time has elapsed after the completion of initial setting (S100) in response to the start of engine revolutions, or when the output switch as the operating switch 305 has been turned on, judgement of the time elapse or judgement of the state of the operating switch 305 is done at the step of output start judgement control (S310) in conjunction with the judgement of whether or not the DC voltage has reached a prescribed level. At this step of output start judgement control (S310), an operation flag is set when the DC voltage has reached a prescribed level and the output switch has been turned on or a required length of time has elapsed.

Figure 7:
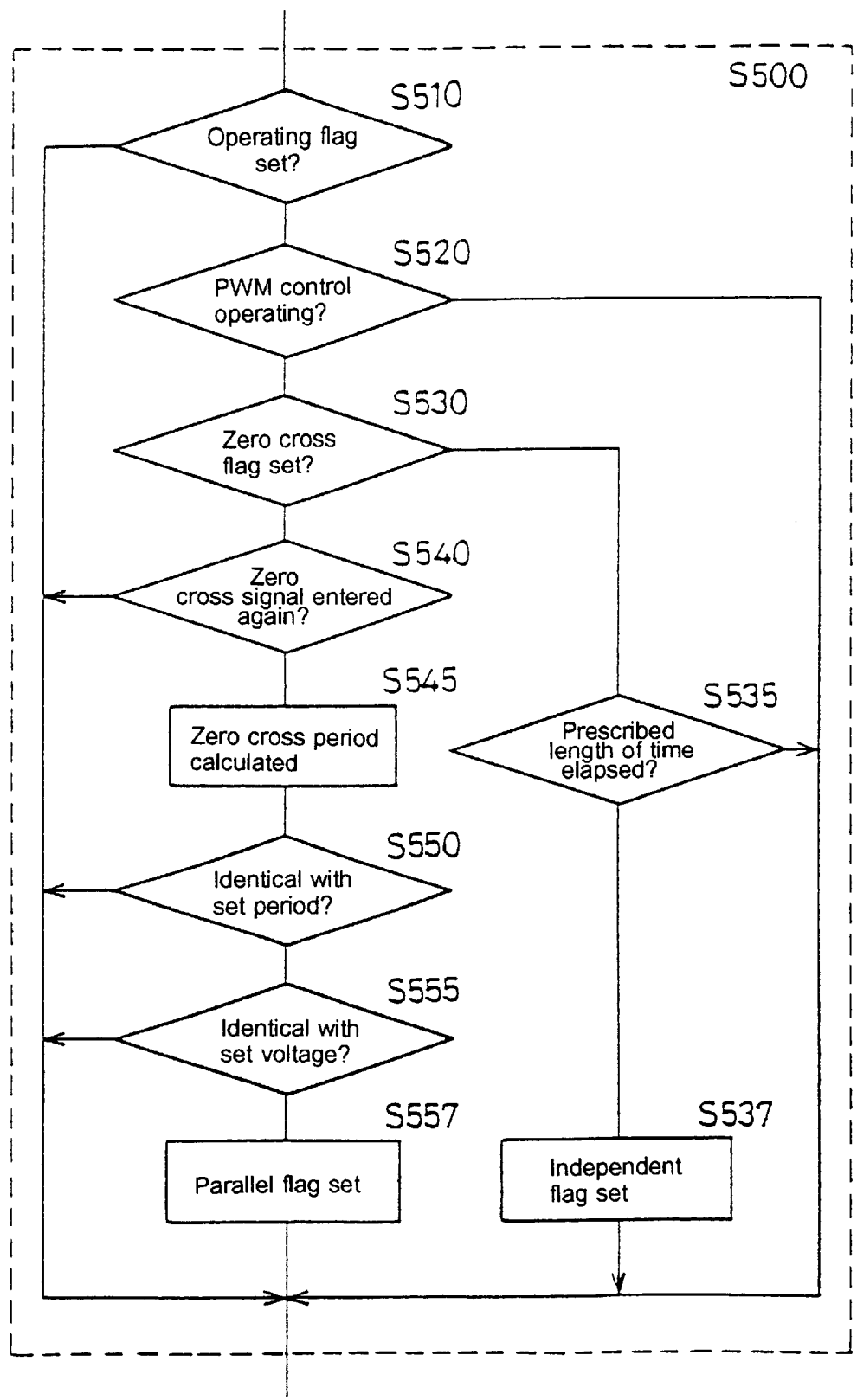
FIG. 7 is a flow chart showing single/parallel discrimination processing in the control operation by the portable generator according to the invention.
Figure 8:
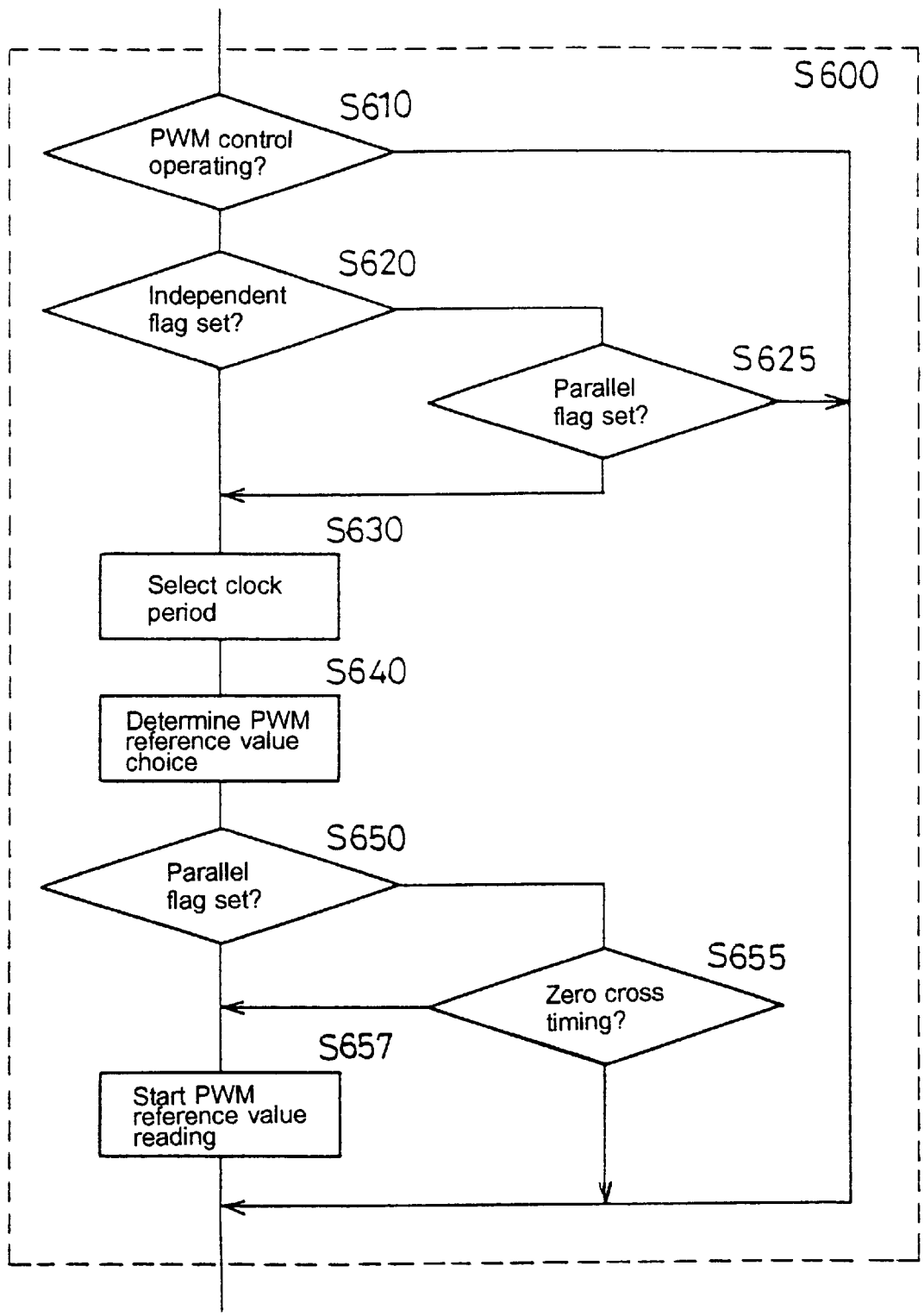
FIG. 8 is a flow chart showing output start control in the control operation by the portable generator according to the invention.

For this reason, as shown in FIG. 7, at the step of independent/parallel discrimination processing (S500), after it is judged whether or not the operation flag is set (S510), it is judged whether or not the PWM-signal-generating unit 441 is operating (S520) and, if the PWM-signal-generating unit 441 is not yet operating, it is judged whether or not the zero cross flag is set (S530).

To add, if the PWM-signal-generating unit 441 is already working, it is only judged whether or not the operation flag is set (S510) and whether or not the PWM-signal-generating unit 441 is working (S520), and independent/parallel discrimination processing (S500) is completed.

Then, if the zero cross flag is already set, it is judged whether or not a prescribed length of time equivalent to two periods of the set frequency or the like, i.e. about 40 msec for 50 Hz or 33 msec for 60 Hz, has elapsed since the setting of the operation flag (S535) and, if the prescribed length of time has not elapsed, independent/parallel discrimination processing (S500) is completed to perform other steps of processing judgement and to repeat to return again to independent/parallel discrimination processing (S500).

In this way, the central control unit 310 repeats the steps of control processing and judgement processing and, when a prescribed length of time equivalent to two periods of the set frequency or the like has passed without setting of the zero cross flag after the setting of the operation flag, sets an independent flag (S537) on the basis of the judgement that the prescribed length of time has elapsed (S535).

Moreover, if a zero cross signal is entered from the square-wave-forming circuit 317 after the operation flag is set and before the prescribed length of time has elapsed, the central control unit 310 judges whether or not a zero cross flag is set (S530) and then whether or not the zero cross signal has been entered again (S540).

Then the central control unit 310, if a zero cross signal has been entered again, calculates the period from the input interval of the both zero cross signals (S545), and judges whether or not this period is equal to the period of the set frequency (S550). This judgement of whether or not the calculated period is equal to the period of the set frequency (S550) is to judge whether or not the both periods are identical within a prescribed tolerable error range, e.g. 0.5% of the set 50 Hz or 60 Hz.

Further, the central control unit 310, if the calculated period of the zero cross signal is found to be identical to the set period, judges whether or not the output voltage level entered from the output-voltage-detecting circuit 340 and the set voltage are identical (S555), judges that they are identical if the difference in peak voltage is within a certain error range, e.g. 5%, and sets a parallel flag (S557) to complete independent/parallel discrimination processing (S500).

To add, even though a zero cross signal is entered, if the period of variation of the detected voltage between the output terminals or the detected voltage level differs from the pertinent setpoint, the parallel flag is not set, and the completion of independent/parallel discrimination processing (S500) is repeated.

Then at the step of output start control (S600), it is judged whether or not the PWM-signal-generating unit 441 is working (S610) and, if the PWM-signal-generating unit 441 is not operating, first it is judged whether or not the independent flag is set (S620) and whether or not the parallel flag is set (S630). If neither the independent flag nor the parallel flag is set, output start control (S600) is completed without starting the PWM-signal-generating unit 441.

Moreover, if either the independent flag or the parallel flag is set, the PWM-signal-generating unit 441 selects a clock for reading PWM reference values out of the PWM reference table, and determines a clock frequency for generating a PWM control signal of a set frequency, such as 50 Hz or 60 Hz (S630).

Further, on the basis of the set voltage, the PWM reference value choice is determined (S640) to select a prescribed PWM reference table out of a plurality of PWM reference tables having prescribed PWM reference values. Incidentally, this determination of PWM reference value choice (S640), if there is only one PWM reference table, a correction factor by which PWM reference values stored in a memory as contents of this PWM reference table is multiplied may be determined on the basis of a voltage setting signal from the setting switch 318 to adjust the output voltage to the setpoint. In this case, the PWM reference values stored in the memory are corrected with the correction factor.

After that, it is judged whether or not the parallel flag is set (S650) and, if the parallel flag is not set, the operation of the PWM-signal-generating unit 441 is started (S657). This start of operation of the PWM-signal-generating unit 441 results in successive reading of PWM reference values at a prescribed speed in response to the determined clock signal, and PWM control signals matching these values are supplied.

Moreover, if the parallel flag is set, the PWM-signal-generating unit 441 is kept stopped until a zero cross signal is entered from the square-wave-forming circuit 317 and, after the zero cross timing is judged (S655) to meet the timing at which the zero cross signal is entered, the operation of the PWM-signal-generating unit 441 is started (S657).

In this zero cross timing judgement (S655), the PWM-signal-generating unit 441 may be started (S657) when a zero cross signal has been entered. Otherwise, the PWM-signal-generating unit 441 is may be started (S657), counting a time lag, in which an output voltage according to a PWM control signal supplied from the PWM-signal-generating unit 441 occurs between the first output terminal 151 and the second output terminal 152, into calculation, after a zero cross signal is entered and immediately before the next zero cross signal is entered.

In this way, on the basis of the output voltage signal from the output-voltage-detecting circuit 340 as the output voltage detecting means and of the zero cross signal from the square-wave-forming circuit 317, the central control unit 310 judges whether or not the zero cross signal was entered within a prescribed length of time since the time when the operation flag was set. Then, if the zero cross signal was not entered within the prescribed length of time, the operation of the PWM-signal-generating unit 441 as the independent-operation-control unit 435 is started, while, if the zero cross signal was entered, it is operated as the synchronous-operation-control unit 437. Further, the operating modes of the synchronous-operation-control unit 437 include comparison of the voltage and the voltage variation period between the output terminals with the voltage and the frequency set by the setting switch 318. If the set frequency and the set voltage differ from those of the voltage entered into the output terminals, the operation of the PWM-signal-generating unit 441 is not started. Moreover, if the frequency and the voltage are found to be identical within the tolerable range, the operation of the PWM-signal-generating unit 441 is started to match the zero cross timing of the voltage entered into the output terminals.

Incidentally, the central control unit 310 may skip the judgement as to whether or not the output voltage entered from the output-voltage-detecting circuit 340 is identical to the set voltage (S555) and, if the frequency is identical, set the parallel flag (S557) to start parallel operation.

Then, after starting the operation of the PWM-signal-generating unit 441, according to judgement as to whether or not the PWM-signal-generating unit 441 is operating (S510, S610), independent/parallel discrimination processing (S500) and output start control (S600) are passed, and unloaded idling control (S400), output stop control (S800) and engine stop control (S900) are also passed, to perform read-in processing (S200) and output control (S700) by which the states of the operating switch 305 and the setting switch 318 are detected.

Figure 9:
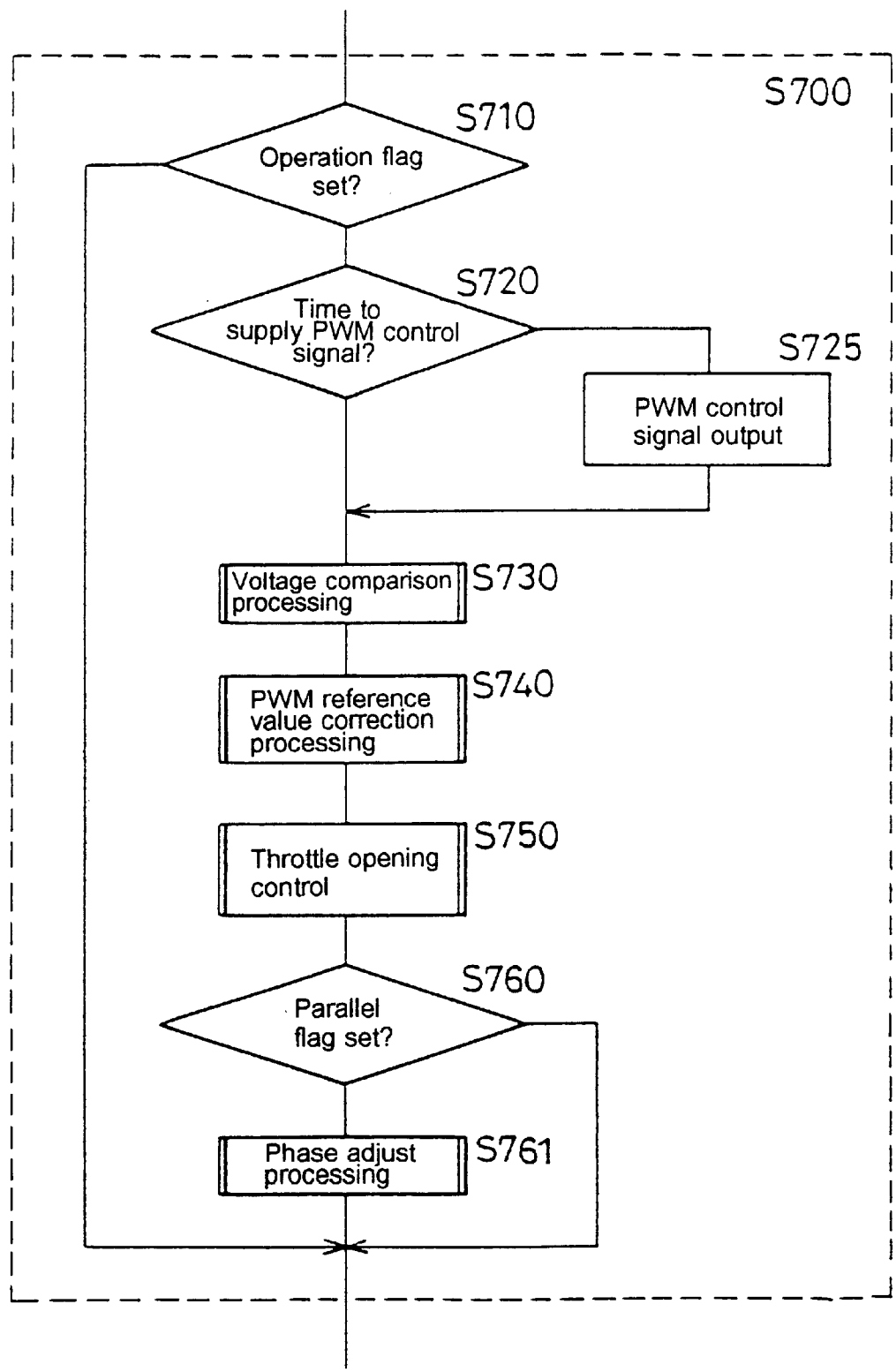
FIG. 9 is a flow chart showing output control in the control operation by the portable generator according to the invention.
Figure 10:
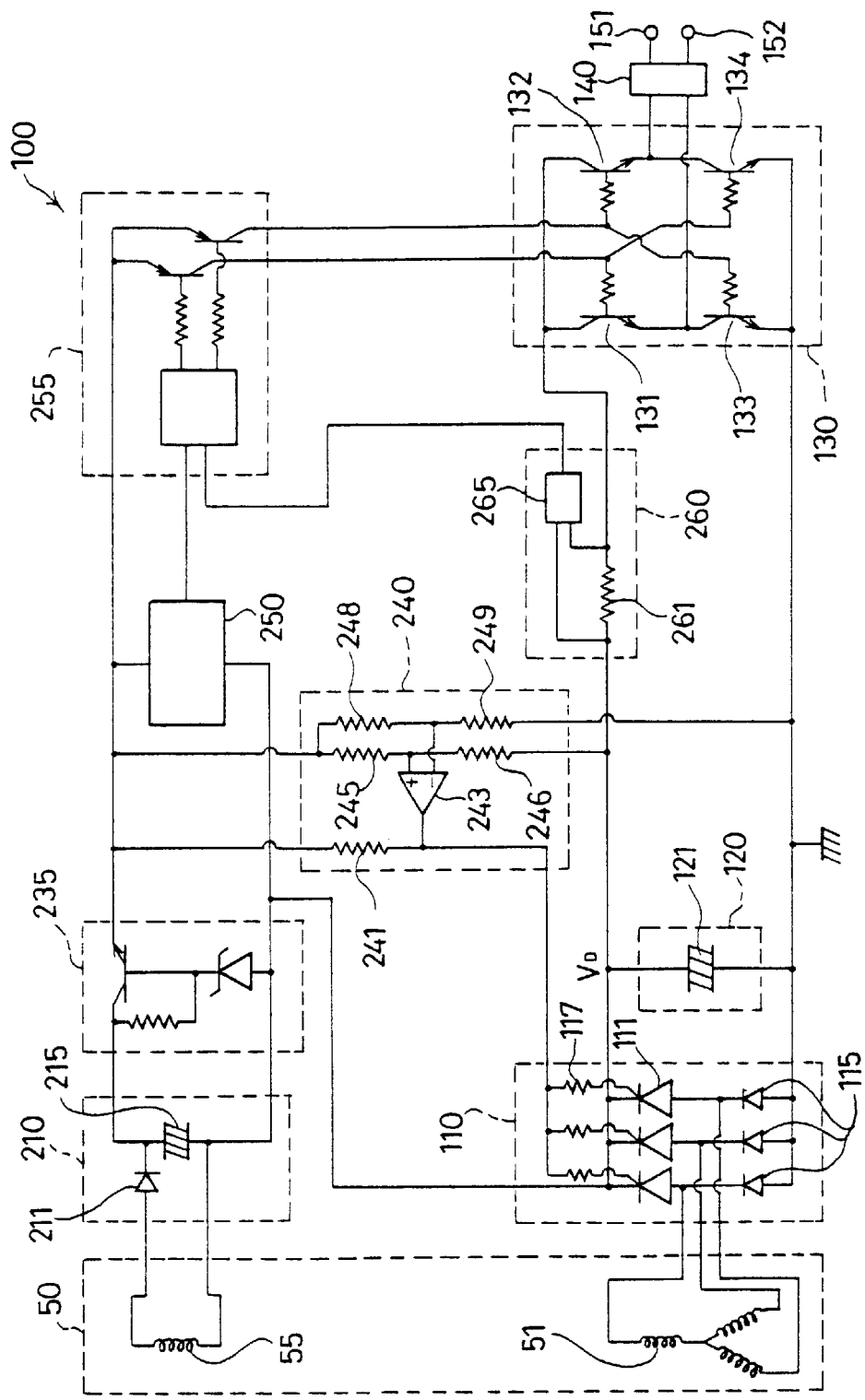
FIG. 10 is a circuit block diagram showing an example of a conventional portable generator.

In this output control (S700), as shown in FIG. 9, it is checked whether or not the operation flag is set according to the judgement as to whether or not the operation flag is set (S710). If the operation flag is set, as the PWM-signal-generating unit 441, the judgement whether or not it is the time to supply the PWM control signal (S720) on the basis of a clock signal is performed. If it is the time to supply the PWM control signal, PWM control signals (S725) based on PWM reference values are successively supplied. Further, as the voltage-waveform-monitoring unit 433, voltage comparison processing (S730) to compare voltage table values with the values of output voltage signals is performed. If any difference is found between a setpoint and the pertinent detected value, the PWM-signal-generating unit 441 will perform PWM reference value correction processing (S740) and, as will be described afterwards, carries out correction to adjust either the average voltage or the peak voltage to the pertinent setpoint, correcting the wave form if it is distorted.

Further, as the throttle-opening-control unit 423, throttle opening control (S750) to match the engine revolutions to the load level is performed, and the judgement whether or not the portable generator 100 is in a state of parallel operation is performed by the judgement as to whether or not the parallel flag is set (S760). When in a state of parallel operation, it operates as the synchronous-operation-control unit 437 to perform phase adjusting control (S761) to be described afterwards.

After starting synchronous operation in this way, the synchronous-operation-control unit 437, at every time the PWM-signal-generating unit 441 supplies a PWM control signal based on 0, which is the leading one of the PWM reference values, determines the zero cross signal entered into the central control unit 310, and performs phase-adjusting control between the portable generator 100 and other generators.

To add, the central control unit 310, when it has detected an abnormal state or the operating switch 305, which is used as the output switch, is turned off, resets the operation flag, passes output control (S700) and performs output stop control (S800) and, as required, further carries out engine stop control (S900)

This output stop processing when the operating switch 305 has been turned off is performed by having an operatingswitch-detecting unit 413 detect the state of the operating switch 305, such as the output switch, by supplying an output stop signal to the output-stop-control unit 443 when the output of the output switch is turned off, and by supplying an operation stop signal from the output-stop-control unit 443 to the PWM-signal-generating unit 441.

Then, this output-stop-control unit 443, when the output stop signal from the operating-switch-detecting unit 413 has been entered on the basis of a change in the state of the operating switch 305, completes processing for a half period of 50 Hz or 60 Hz at the timing when the PWM-signal-generating unit 441 successively reads out the PWM reference values recorded in PWM reference tables to form PWM control signals, and supplies an operation stop signal to the PWM-signal-generating unit 441 at the timing of reading a PWM reference value for an output voltage of 0 to have the PWM-signal-generating unit 441 stop supplying PWM control signals.

In this way, since the output-stop-control unit 443 stops the output of PWM control signals from PWM-signal-generating unit 441 at the timing of reading out a PWM reference value to reduce the output voltage to 0, and since it stops the inverter circuit 130 by placing the first transistor 131 to the fourth transistor 134 in a state of discontinuity in the inverter circuit 130, it can stop the output from the inverter circuit 130 when the potential difference between the first output terminal 151 and the second output terminal 152, i.e. the output voltage, is 0 V. Therefore, the output from the portable generator 100 can be stopped at a timing when no charge is accumulated in capacitors such as the low pass filter 140.

Accordingly, the charges accumulated in the low pass filter 140 and elsewhere can be minimized, and the residual voltage between the output terminals can be eliminated.

Incidentally, as the operating switch 305, besides an output switch to determine to supply and to stop the single-phase AC voltage from the first output terminal 151 and the second output terminal 152, a generator stop switch to stop the engine after the stop of single-phase AC voltage supply may be used as well.

In this case, an output stop signal issued from the operating-switch-detecting unit 413 causes the output-stop-control unit 443 to stop the operation of the PWM-signal-generating unit 441 and also to stop the engine using the throttle-opening-control unit 423 or otherwise.

Moreover, in stopping the operation of the PWM-signal-generating unit 441 by the output-stop-control unit 443, not only when the output of the PWM control signal from the PWM-signal-generating unit 441 is stopped at the timing of reading out a PWM reference value to reduce the output voltage to 0, but also when the output stop signal has been entered from the operating-switch-detecting unit 413, the PWM-signal-generating unit 441 may be stopped from issuing the PWM control signal by supplying an operation stop signal to the PWM-signal-generating unit 441 at the time of input of a zero cross signal from the square-wave-forming circuit 317.

In this way, the central control unit 310 as the output-stop-control unit 443, after the operating switch 305 is manipulated, stops the PWM-signal-generating unit 441 from issuing the PWM control signal when a zero cross signal is entered and stops the inverter circuit 130. Therefore, also in this case, it stops the inverter circuit 130 when the output voltage is 0 and stops the output from the portable generator 100, so that the output from the portable generator 100 can be stopped at a timing when no charge is accumulated in capacitors such as the low pass filter 140.

Further, this central control unit 310 performs emergency stop control over the output voltage with the circuit-protecting unit 431, controls the DC-voltage-generating circuit 110, and also effects revolution control over the engine with the throttle-opening-control unit 423.

The control over the DC-voltage-generating circuit 110 by this circuit-protecting unit 431 is carried out by the stopping circuit 360 via the thyristor-control circuit 170. This stopping circuit 360, as shown in FIG. 3, is configured of a switching transistor 361 whose base is connected to the central control unit 310. The emitter of the switching transistor 361 is grounded, and the collector thereof is connected to the cathode of the light emitting diode 177 in the photocoupler 175.

When this stopping circuit 360 is to control the DC-voltage-generating circuit 110, at the time of starting the engine, the stop control signal is supplied from the circuit-protecting unit 431 to the stopping circuit 360 until the revolution frequency signal entered from the revolution-frequency-detecting circuit 319 keeps being stabilized, and the light emitting diode 177 is turned on not to allow the thyristor-control circuit 170 to issue any continuity signal.

Then, when the revolutions of the engine have become stabilized, the output of the stop control signal is stopped, it is confirmed according to a DC voltage signal from the DC-voltage-detecting circuit 320 that the voltage of the DC-power-source unit 120 has reached a prescribed voltage between 160 and 200 V, and the output of the PWM control signal from the PWM-signal-generating unit 441 is started under the control of the independent-operation-control unit 435 or the synchronous-operation-control unit 437.

Further, the engine is controlled by turning a pulse motor of the throttle-control mechanism 315 either forward or backward with the engine-speed-detecting unit 421 and the throttle-opening-control unit 423 via the throttle driver 313.

This engine revolution control procedure, by setting the opening degree signal entered from the throttle-control mechanism 315 to a prescribed value to match the output current signal from the output-current-detecting circuit 330, or by setting the count of the pulse counter of the throttle-control mechanism 315 to a prescribed value, provides a prescribed frequency of revolution to match the output. Moreover, highly efficient voltage conversion is carried out by correcting the throttle opening to match the ratio of the length of time during which a continuity signal is supplied to the DC-voltage-generating circuit 110 according to the cathode potential of the light emitting diode 177 in the photocoupler 175, i.e. the continuity rate of the thyristors 111.

Moreover, in this portable generator 100, when any overcurrent exceeding the rated amperage flows, the circuit-protecting unit 431 of the central control unit 310 performs control to stop the operation of the DC-voltage-generating circuit 110 and the inverter circuit 130 to protect the power circuit 101 by stopping the single-phase AC voltage supply, and at the same time the overcurrent-detecting circuit 350 effects control to stop the operation of the DC-voltage-generating circuit 110.

This control by the circuit-protecting unit 431 to protect power circuit 101 stops the output of the PWM control signal from the PWM-signal-generating unit 441 after the lapse of several seconds to several minutes when the output amperage has surpassed 1.2 times of the rated voltage, and starts supplying a stop control signal to the stopping circuit 360.

Then, when the output amperage is so large according to the value that is an excess to 1.2 times of the rated amperage, the supply of the stop control signal is started after the lapse of a smaller length of time and the PWM-signal-generating unit 441 is caused to stop supplying the PWM control signal, or when the value is small, the supply of the stop control signal is started and stop control over the output of the PWM control signal is effected after the lapse of a greater length of time, thereby to stop supplying the single-phase AC voltage. Moreover, when the output amperage has surpassed twofold of the rated voltage, the output of the PWM control signal is immediately stopped, and the output of the stop control signal is started to stop supplying the single-phase AC voltage.

Further, when the generation of an abnormal voltage in the power circuit 101 is detected: i.e. when the DC voltage detected by the DC-voltage-detecting circuit 320 or the output voltage detected by the output-voltage-detecting circuit 340 becomes abnormally high, when the output voltage drops substantially below its setpoint, e.g. 100 V, or when a lower voltage than 100 V is sustained; the circuit-protecting unit 431 also supplies a stop control signal to the stopping circuit 360 and, by causing the PWM-signal-generating unit 441 to stop supplying the PWM control signal, stops the output of the single-phase AC voltage from the first output terminal 151 and the second output terminal 152.

Moreover, the overcurrent-detecting circuit 350 provided separately from the central control unit 310, when the output amperage has reached nearly twofold of the rated voltage, stops the output of the continuity signal from the thyristor-control circuit 170 to the DC-voltage-generating circuit 110 by issuing an L level stop signal to the photocoupler 175.

Accordingly, when the output amperage has reached nearly twofold of the rated voltage, each of the thyristors 111 of the DC-voltage-generating circuit 110 is placed in a state of discontinuity, and the power supply from the DC-power-source unit 120 to the AC generator 50 is stopped. Therefore, the output voltage of the DC-power-source unit 120 drops.

Therefore, there is a drop in the output voltage which results from the conversion of the output voltage of the DC-power-source unit 120 into an AC voltage under PWM control and is the potential difference between the first output terminal 151 and the second output terminal 152, generated by the first PWM signal and the second PWM signal in accordance with a PWM control signal given a fixed duty ratio, and the load current is also reduced, making it possible to prevent the output of the single-phase AC voltage from being immediately stopped when the output current has surpassed twofold of the rated amperage or to prevent the output of single-phase AC voltage from being stopped in a very short length of time when the output amperage has substantially surpassed 1.2 times of the rated amperage.

To add, the reference voltage to be set for the overcurrent-detecting circuit 350 to supply a stop signal is not limited to detection of what matches almost twofold of the rated amperage by the output-current-detecting circuit 330, but can be set appropriately together with the output amperage at the time of supplying a stop control signal to the central control unit 310 according to the characteristics, durability and safety standards of the elements constituting the power circuit 101. For instance, it is also conceivable to stop the rectifying action of the DC-voltage-generating circuit 110 when a current surpassing 1.5 times of the rated amperage is about to flow, thereby to stop power supply from the DC-power-source unit 120 to the AC generator 50 and to reduce the output voltage.

Moreover, in stopping the output of the PWM control signal from the PWM-signal-generating unit 441 with a stop control signal from the circuit-protecting unit 431, the operation of the PWM-signal-generating unit 441 is stopped immediately when the stop control signal is issued from the circuit-protecting unit 431 and the output of the overcurrent from the first output terminal 151 and the second output terminal 152 is immediately stopped to protect the portable generator 100 and appliances connected to the portable generator 100 as its loads.

INDUSTRIAL APPLICABILITY

According to the present invention, there is provided a portable generator which generates an AC voltage by turning an AC generator, once rectifies this AC voltage into a DC, which is then converted by an inverter circuit into a single-phase AC voltage of a fixed level and of a prescribed frequency, and supplies this single-phase AC voltage. This portable generator has an output-stop-control unit which, when an operating switch is turned off, stops the operation of the inverter circuit at the timing when the voltage between the output terminals drops to 0.

Therefore, electric charges remaining in the low pass filter or the like provided between the inverter circuit and the output terminals are kept to the minimum, so that the portable generator in which no DC voltage remains at the output terminals can be provided.

What is claimed is:

1. A portable generator turning an AC generator by an engine to form an AC voltage, once rectifying the AC voltage into a DC voltage, converting the DC voltage into a fixed single-phase AC voltage of a prescribed frequency by an inverter circuit, and outputting the single-phase AC voltage, via a low pass filter, through output terminals;

which includes an output-stop-control unit for stopping the operation of the inverter circuit at the time when the single-phase AC voltage between the output terminals, by an operating switch being turned off, drops to 0 V.

* * * * *